(12) United States Patent
Taylor

(10) Patent No.: US 6,584,557 B1
(45) Date of Patent: Jun. 24, 2003

(54) PROCESSOR AND METHOD FOR GENERATING A POINTER

(75) Inventor: James Leigh Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 09/603,681

(22) Filed: Jun. 26, 2000

(30) Foreign Application Priority Data

Nov. 11, 1999 (GB) .............................................. 9926600

(51) Int. Cl.$^7$ .............................................. G06F 12/00
(52) U.S. Cl. ........................ 711/220; 711/214; 711/215
(58) Field of Search .................................. 711/220, 214

(56) References Cited

U.S. PATENT DOCUMENTS

| 5,617,569 A | * | 4/1997 | Gray et al. | 707/103 R |
| 5,845,331 A | * | 12/1998 | Carter et al. | 711/152 |
| 5,915,255 A | * | 6/1999 | Schwartz et al. | 707/206 |
| 6,003,123 A | * | 12/1999 | Carter et al. | 711/207 |
| 6,138,269 A | * | 10/2000 | Ball et al. | 707/103 R |
| 6,161,219 A | * | 12/2000 | Ramkumar et al. | 717/116 |

* cited by examiner

Primary Examiner—Reba I. Elmore
(74) Attorney, Agent, or Firm—Michael J. Buchenhorner; Casey P. August

(57) ABSTRACT

A processor is provided for calculating an output pointer to a first data item by combination of an input pointer to a second data item with an offset. The processor includes logic for generating, in a single operation, a zero value for the output pointer when the input pointer is zero and an output pointer value calculated as the offset value added to, or subtracted from, the input pointer value when the input pointer is non-zero.

9 Claims, 2 Drawing Sheets

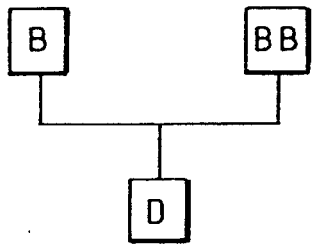
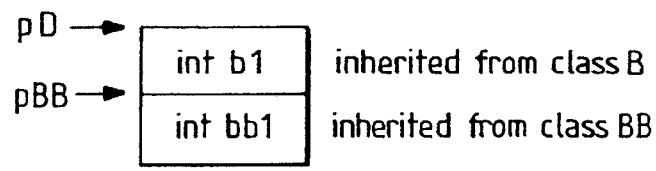
FIG. 3A
FIG. 3B
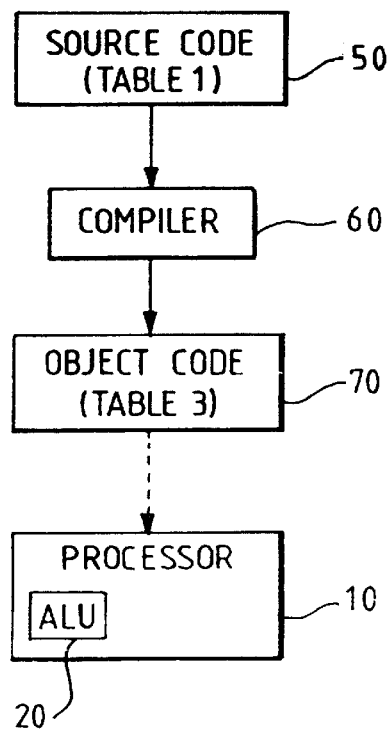
FIG. 4

PROCESSOR AND METHOD FOR GENERATING A POINTER

FIELD OF THE INVENTION

The present invention relates generally to the field of programming in which an output pointer to a first data item is generated by combination of an input pointer to a second data item, and an offset.

BACKGROUND OF THE INVENTION

In some programming languages, it is necessary to cast a pointer to a first data item to a pointer to a second data item. The nature of the cast depends on the relationship between the data items and on the implementation and target processor. Pointer casting is employed in procedural languages such as C and object-oriented languages such as C++. As an example, in object oriented programming languages such as C++ there are many situations where it is necessary to calculate a pointer to an instance of one class from a pointer to an instance of another class. The arithmetic required depends on the relationship between the two classes, the relationship of the two instances, and upon specific implementation details of the compiler and target processor involved.

Example cases where pointer calculations arise include the following.

Cast of pointer to instance of Derived class to pointer to instance of Base class: class D (Derived) inherits from class B (Base) and a method of class D invokes a method inherited from class B then, as part of the implementation of the invocation, the compiler must generate object code to cast the pointer to the instance of class D to a pointer to the instance of class B. In the case of public inheritance this cast is implicitly generated by the compiler.

Cast of pointer to instance of Base class to pointer to instance of Derived class: If class D (Derived) inherits from class B (Base) and a virtual method of class B is invoked, and that virtual method is overridden (has an implementation defined) in class D then polymorphic behaviour results. The class D method will be invoked so, as part of the implementation of the invocation, the compiler must generate object code to calculate the instance pointer for class D. This is an implicit cast from a pointer to an instance of class B to a pointer to an instance of class D.

Invocation of a method on a data member: If class C contains member data for which it is desired to invoke an object method, then as part of the implementation of the invocation the compiler must generate object code to calculate a pointer to the data member from the instance pointer of the containing class C.

Access to a data member: If a class contains member data, and direct access to the member data is required (e.g. for a load or store operation), then the compiler must generate object code for the appropriate address arithmetic to access that data. This arithmetic may be performed in the ALU (Arithmetic Logic Unit) of the processor, or as part of the access itself by use of base+offset arithmetic in the load/store unit of the processor.

Typically pointer arithmetic involves adding or subtracting a fixed offset, which may be zero, and also dealing with the case where the input pointer p is NULL. In the case of zero offset, no arithmetic (and hence no code) is involved. In the non-zero offset case the compiler has to deal with two cases—the input pointer p could be NULL or non-NULL. In general NULL is taken to be represented by the value 0.

If the pointer is NULL, then the result of any such calculation should also be NULL.

If the pointer is non-NULL, then the calculation should proceed to add or subtract the offset as required.

The compiler generates appropriate instruction sequences to achieve this conditional arithmetic. In existing processor implementations this will typically comprise a test of the pointer for non-zero, followed by some conditional logic (e.g. conditional branch or conditional execution) and an add/subtract instruction to amend the pointer with the relevant offset.

In general, in the case where the offset is non-zero, the conditional pointer arithmetic tends to be clumsy and slow.

Because existing implementations of the conditional arithmetic for the case when the offset is non-zero are clumsy and slow, compilers typically use the following strategies to mitigate the problem.

Wherever possible, ensure that the offsets involved are zero. This avoids the non-zero offset case. This strategy trades data layout simplicity for safety and speed.

Ignore the NULL pointer issue, and generate unconditional offset arithmetic. This is fast but unsafe since it does not deal with the NULL pointer case. This strategy trades safety for speed and code compactness.

Generate fully conditional code that deals with the NULL pointer case. This is safe code, but is slower and larger than case 2. This strategy trades speed and code compactness for safety.

Strategy 1 can make the data layout more complex. For example if class D inherits from class B then the instance data inherited from class B would be placed at offset 0 within the instance data for class D. Furthermore, if class D has a virtual function table pointer whereas class B does not, then under this strategy the virtual function table pointer cannot be placed at offset 0 within the instance data of class D since this position is already occupied by the instance data inherited from class B.

Additionally strategy 1 cannot be universally applied. In the case of multiple inheritance data from each of the base classes cannot all appear at offset zero in the instance data of the derived class. Furthermore, in the case of aggregation where a class has more than one item of member data, strategy 1 cannot be universally applied because not all the member data can have zero offset.

It would be desirable to provide a technique and apparatus which ameliorates at least some of the disadvantages of the prior art.

SUMMARY OF THE INVENTION

According to one aspect of the invention, therefore, there is provided a processor for calculating an output pointer to a first data item by combination of an input pointer to a second data item with an offset, the processor including logic for generating, in a single operation, a zero value for the output pointer when the input pointer is zero and an output pointer value calculated as the offset value added to, or subtracted from, the input pointer value when the input pointer is non-zero.

Thus in accordance with the invention, a single instruction primitive is defined that allows the processor to carry out, in a single operation, the conditional arithmetic described above thereby avoiding the need, in the prior art, for a plurality of processor instructions to carry out the same operation.

In accordance with another aspect of the invention there is provided a compiler that supports the new instruction, the compiler being implemented as a compiler program product comprising a computer readable medium on which is recorded compiler code for generating an output pointer to a first data member by combination of an input pointer to a second data member and an offset, the compiler code including means for generating a single instruction which when executed on a processor of a data processing system causes .the generation of a zero output when the input pointer is zero and causes the generation of an output pointer value equal to the offset value added to, or subtracted from, the input pointer value when the input pointer is non-zero.

It will be appreciated that the present invention also encompasses object code, which may or may not have been compiled from source code, that includes the new instruction. According to another aspect of the invention therefore there is provided a computer program product comprising a computer readable medium having recorded thereon object program code which when executed on a processor of the computer causes the processor to generate the value for an output pointer to a first data member by combining a value for an input pointer to a second data member and an offset, the object code means including a processor instruction to cause the processor to generate, in a single operation, a zero value for the output pointer when the input pointer is zero and an output pointer value calculated as the offset value added to, or subtracted from, the input pointer value when the input pointer is non-zero.

BRIEF DESCRIPTION OF THE DRAWINGS

Embodiments of the various aspects of the invention will now be described, by way of example only, with reference to the accompanying drawings.

FIG. 3A is a representation of multiple inheritance in which class D inherits from both class B and class BB;

FIG. 3B shows an instance of class D where the offset is from pD to pBB; and

FIG. 4 is a diagram illustrating the operation of a compiler in accordance with the invention.

DESCRIPTION OF THE PREFERRED EMBODIMENTS

According to the invention, the required arithmetic is implemented directly in the processor (either as hardware or "picocode"). The new arithmetic is then available as one or more primitive instructions (in the same way as add and subtract are primitive instructions). Compiler enhancements may be made to use these new instructions to implement conditional pointer arithmetic as described above.

Because the required pointer arithmetic is available in a single primitive instruction, the object code for this arithmetic is no longer clumsy or slow. This means that compilers no longer need to trade off speed and safety. Implementations can be both fast and safe.

Figure 1:
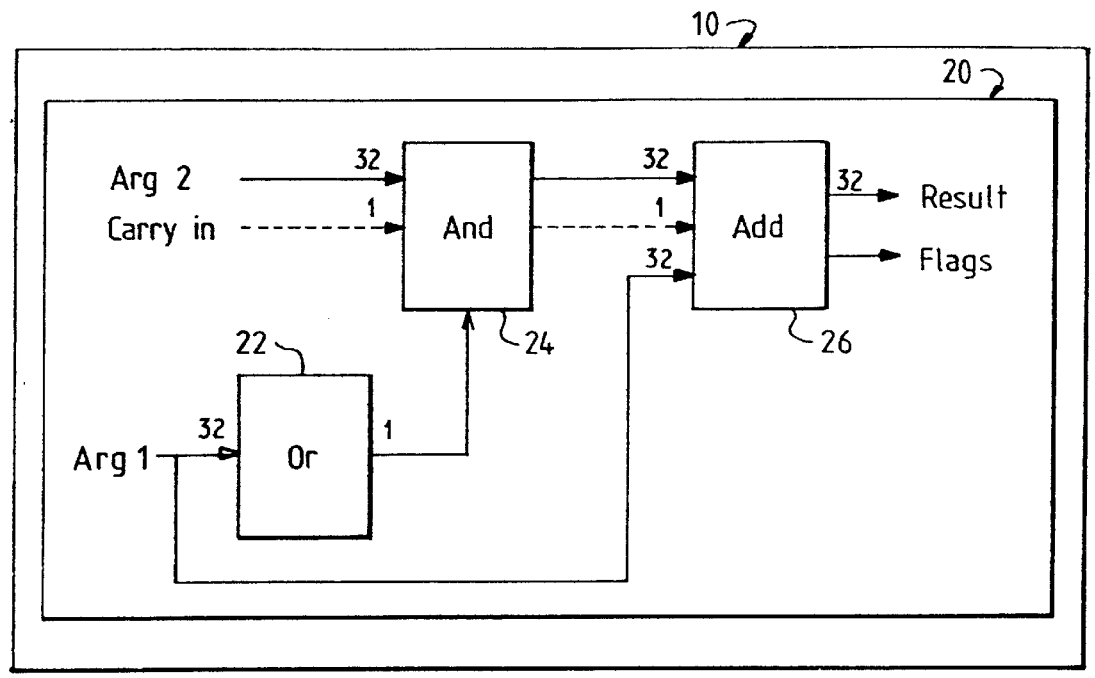
FIG. 1 is a block diagram of a processor showing part of an arithmetic logic unit embodying the present invention.

In one embodiment, the logic for the new instruction is implemented within the arithmetic logic unit 20 of the processor 10 as shown in FIG. 1. In the example embodiment, Arg1 is the input pointer, and Arg2 the offset. Each is assumed to be 32 bits wide, although other bit widths are equally possible.

The bits in Arg1 are all OR-ed together, by the OR block 22, the output of which is zero if and only if all the bits of Arg1 are 0 i.e. when Arg1 is 0. The output of the OR block is fed to an AND block 24 which gates all the bits of Arg2 and the optional carry in bit. Hence the operation of the AND block is to pass Arg2 and carry in if Arg1 is non-zero, otherwise to output zero for both.

The ADD block adds the gated Arg2 to Arg1 together with the gated optional carry bit, producing result and flags (such as zero, negative, carry, overflow) as in conventional add implementations.

The arithmetic can be evaluated as follows.

When Arg1 !=0, then the output of the OR is 1, the output of the AND is Arg2 together with carry in, and the output of the ADD is Arg1+Arg2+Carry in. This is a conventional addition operation.

When Arg1==0, the output of the OR is 0, the output of the AND is 0 together with 0 for the carry in, and the output of the ADD is Arg1+0+0=Arg1=0 as stated.

Figure 2:
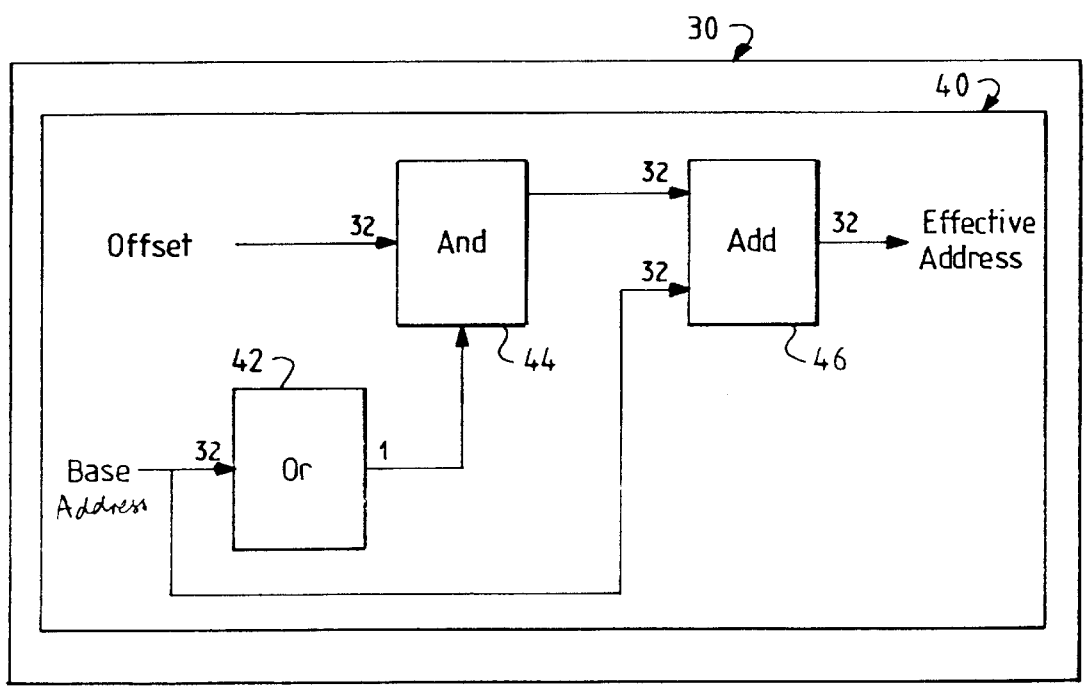
FIG. 2 is a block diagram of load/store logic in which the invention may be implemented.

As well as having application in the ALU of a processor and hence appearing as a direct arithmetic instruction, the same arithmetic may also be used in the base+offset section of the address calculation unit for loads and stores. An example processor 30 with Load/Store logic 40 is shown in FIG. 2 with OR block 42, AND block 44 and ADD block 46. It will be seen that the logic is similar in function (without carry or flags) to that shown in FIG. 1 with 'Offset' corresponding to Arg2, 'Base Address' corresponding to Arg1 and 'Effective Address' corresponding to Result. Using the logic of FIG. 2, if an access is attempted using a base value of zero, then the resultant effective address is also zero whatever the offset. This is useful in trapping accesses involving NULL base pointers since the effective address calculated will always be 0 regardless of the offset involved.

Next will be described example code showing the operation of the present invention.

The C++ source code shown in Table 1 below describes two base classes, B and BB. Class D is derived from both classes. This is an example of multiple inheritance, and an instance of class D will have a complete set of member data inherited from each of the base classes. This relationship is shown in FIG. 3A.

Function test 1 has as input a pointer d to an instance of class D and returns a pointer to the instance data of class BB embedded in the instance of D. This is a cast from a pointer to an instance of a derived class to pointer to the inherited instance of a base class.

Function test 2 goes the other way. Function test 2 has as its input a pointer bb to an instance of class BB and returns a pointer containing instance data of class D in which the instance data of class BB pointed to by pointer bb has been embedded by inheritance. This is a cast from a pointer to an instance of a base class to a pointer to an instance of a derived class in which the base class instance has been embedded by inheritance.

In the case where the input parameters to these functions are non-NULL, then the computation is simply a matter of adding (in case test 1) or subtracting (in case test 2) the offset of the member data inherited from class BB contained within the instance data of derived class D.

In the case where the input parameter is NULL (i.e. the input pointer does not point at a valid instance of the relevant class), then the returned value of each function should also be NULL.

As shown in FIG. 3B, the offset is from pD to pBB. This can result in addition or subtraction, depending on the direction of the conversion. Subtraction is the same as addition of a negated quantity. Offsets will be placed as immediate values in the output code.

TABLE 1

C++ SOURCE CODE

```
class B      {int b1;} ;
class BB     {int bb1;};
class D : public B, public BB
    {
    };
extern "C" BB   * test1(D * d )     {return    d;}
extern "C" D    * test2(BB * bb)    {return (D *) bb;}
```

The resultant assembler code from a compiler which does not support the instruction primitive of the present invention is shown in Table 2. The resulting abridged assembler code is obtained using the Metaware High C/EC++/C++ compiler with optimisation turned off), but other compilers would generate similar code. The parameter passing convention is that the input parameter is passed in register %r0, and the return value is also passed in register %r0.

TABLE 2

OUTPUT OF CONVENTIONAL COMPILER

```
;-------------| test1 |------------------
test1:
    sub.f       0, %r0, 0
    nop
    beq         .LN09.6
    add         %r0, %r0, 4
.LN09.6:
    j           [%blink]
;-------------| test2 |------------------
test2:
    sub.f       0, %r0, 0
    nop
    beq         .LN10.6
    add         %r0, %r0, -4
.LN10.6:
    j           [%blink]
```

In each case the input parameter in %r0 is tested to see if it is 0 (NULL). If so, then a conditional branch is taken to the return statement j [%blink]. The return value then is also 0 (NULL).

In the case when %r0 is non-null, the conditional branch is not taken, and the offset 4 (in the case of test 1) or -4 (in the case of test 2) is added to the input value in %r0 to give a new value in %r0. This value is then available as the return value for the function.

The underlying arithmetic then may be summarised as:

return_value=(input_value!=0)?(input_value+offset):0;

On prior art processor implementations this is implemented as a test of input_value for zero, followed conditionally by the calculation of return_value as input_value+offset (in the non-zero case, or simply 0 (in the zero case).

Thus it can be seen that, using prior art processors, such a calculation will take a number of processor instructions which will take a number of cycles to execute. Such an implementation is larger and slower than can be achieved by the invention. Furthermore in the case where the conditional branch is taken, there is a further performance impact because the instruction flow is not sequential, so there may be cycles wasted while a prefetch buffer is purged and then filled starting from the target of the branch.

In the present invention, the arithmetic required is a modification of the add/subtract operation that is implemented directly in the processor hardware (e.g. arithmetic logic unit) as a set of one or more native instructions. Using a new mnemonic sp_add (special add) instruction for this new arithmetic primitive, the equivalent object code is as shown in Table 3 below. Thus, in the present invention, the required arithmetic is achieved in a single software instruction.

TABLE 3

OUTPUT OF COMPILER SUPPORTING SP ADD INSTRUCTION PRIMITIVE

```
;-------------| test1 |------------------
test1:
    sp_add      %r0, %r0, 4
    j           [%blink]
;-------------| test2 |------------------
test2:
    sp_add      %r0, %r0, -4
    j           [%blink]
```

The operation of the invention is shown in block-diagrammatical form in FIG. 4. The source code as shown in Table 1 is compiled by a compiler 60 supporting the new instruction primitive to produce the object code 70 represented by the assembler code of Table 3 which is then ready for execution on processor 10 including ALU 20 as shown in detail in FIG. 1.

Clearly, other embodiments and modifications of this invention will readily occur to those of ordinary skill in the art upon reading these teachings. Therefore, this invention is to be limited only by the following claims, which include all such embodiments and modifications when viewed in conjunction with the above specification and accompanying drawings.

What is claimed is:

1. A processor for calculating an output pointer, pointing to a first data item, by combination of an input pointer, pointing to a second data item, with an offset, the processor comprising: logic for generating, in a single operation, a zero value for the output pointer when the value of the input pointer is zero and an output pointer value calculated as the offset value added to or subtracted from, the input pointer value when the input pointer value is non-zero.

2. The processor as claimed in claim 1 wherein the logic is implemented in an arithmetic logic unit of the processor.

3. The processor as claimed in claim 2 wherein the logic comprises OR logic to which the input pointer value is applied such that the output of the OR logic is zero only when the input pointer value is zero, the logic further comprising AND logic to which the result of the OR logic is logically combined with the offset value such that the output of the AND logic is equal to the offset value only when the result of the OR logic is non-zero, the logic further comprising Add logic for generating the output pointer value by adding the result of the AND logic to the input pointer value.

4. A method in a processor for generating object code which calculates an output pointer to a first data member by combination of an input pointer to a second data member and an offset, the method comprising the steps of:
compiling source code defining the mapping between the input and output pointers to generate object code which when executed on the processor of a data processing system causes, in a single operation, the generation of a zero output when the input pointer value is zero or the generation of an output pointer value equal to the offset value added to, or subtracted from, the input pointer value when the input pointer is non-zero.

5. The method as claimed in claim 4 wherein the first data member is a derived class and the second data member is an inherited instance of a base class.

6. A software compiler for generating object code which when executed on a processor calculates an output pointer to a first data member by combination of an input pointer to a second data member and an offset, the compiler including:

means for generating a single instruction primitive which when executed on a processor of a data processing system causes the generation of a zero output when the input pointer value is zero and causes the generation of an output pointer value equal to the offset value added to, or subtracted from, the input pointer value when the input pointer value is non-zero.

7. The software compiler as claimed in claim 6 wherein the first data member is an instance of a class and the second data member is an inherited instance of the associated base class.

8. A computer program product comprising a computer readable medium having recorded thereon object program code which when executed on a processor causes the processor to generate a value for an output pointer, pointing to a first data member, by combining a value for an input pointer, pointing to a second data member, and an offset, the object program code including a processor instruction that generates, in a single operation, a zero value for the output pointer when the input pointer value is zero and an output pointer value calculated as the offset value added to, or subtracted from, the input pointer value when the input pointer value is non-zero.

9. Processor Logic for calculating an effective address by combining a base address and an offset, the processor logic including load/store logic for generating, in a single operation, a zero value for the effective address when the base address is zero and an effective address calculated as the offset added to, or subtracted from, the base address when the base address is non-zero.

* * * * *